United States Patent Office

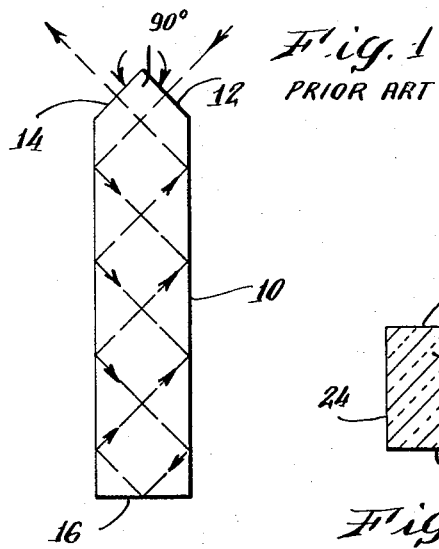
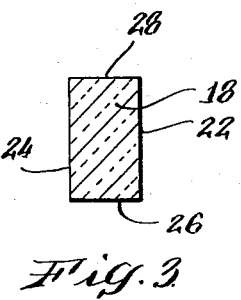
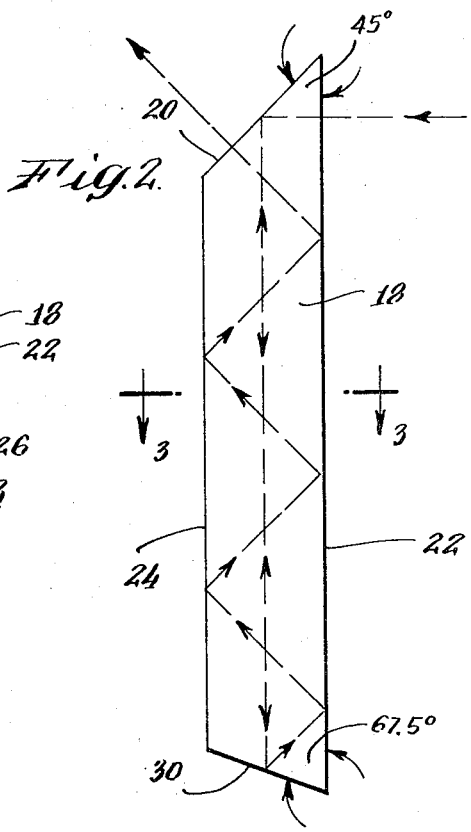
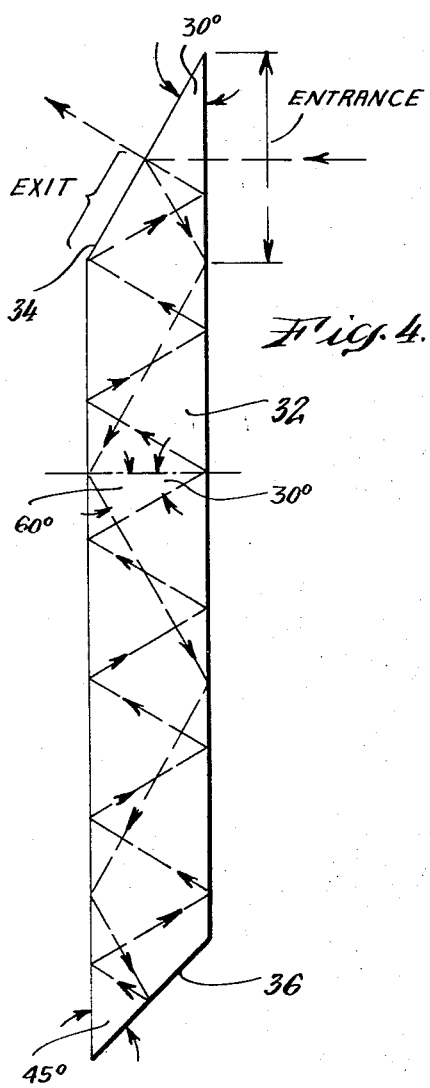
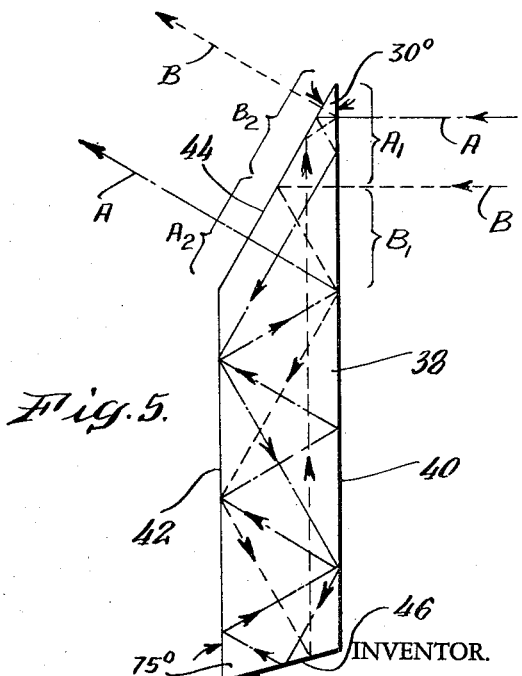
INVENTOR.
Anthony C. Gilby
BY Buckles & Bramblet
ATTORNEYS

3,669,545
Patented June 13, 1972

3,669,545
APPARATUS AND METHOD FOR ANALYSIS
BY ATTENUATED TOTAL REFLECTION
Anthony C. Gilby, Darien, Conn., assignor to Wilks
Scientific Corporation, South Norwalk, Conn.
Filed May 6, 1971, Ser. No. 140,677
Int. Cl. G01j *3/00;* G01n *1/10*
U.S. Cl. 356—74                                    18 Claims

ABSTRACT OF THE DISCLOSURE

There is disclosed a novel family of crystal probes for use in making spectroscopic studies by the technique of attenuated total reflection. In prior art crystals used for probe type measurements, only approximately half the radiant energy passing through the crystal reached the detector. There is disclosed herein a class of crystals in which one face serves simultaneously to both totally reflect energy into the crystal and transmit energy out of the crystal. As a result, substantially all the entering energy reaches the detector. There is also disclosed a novel, double beam instrument which employs a crystal of the type referred to herein. In this instrument a portion of the radiation is directed into the crystal and thence to the detector. A reference beam of the radiation is passed directly to the detector. By means of a chopper and an electronic circuit there is provided a ratio readout of the sample and reference beams.

BACKGROUND OF THE INVENTION

A number of shapes of reflector crystals have been proposed for use in ATR spectroscopy. One such prior art crystal is illustrated in FIG. 1. This is an elongated crystal of rectangular cross section and having a 90° roof. As radiation both enters and leaves at one end, it is particularly useful for probe type measurements wherein the crystal is immersed in a fluid to be analyzed. Because the radiation makes many reflections inside the crystal and the rays enter with a range of angle about the central ray, roughly half the radiation will exit from each of the two tap faces. In other words, the efficiency of energy transfer is reduced to half of what it would have been had all the radiation exited toward the detector. Accordingly, it is a primary object of the present invention to provide an improved crystal wherein substantially all the entering radiation exits toward the detector. Other objects, features and advantages will become apparent from the following description and the appended claims.

BRIEF DESCRIPTION OF THE DRAWINGS

The present invention may be best understood by reference to the following description taken in conjunction with the accompanying drawings wherein:

FIG. 1 illustrates a crystal in accordance with the prior art;

FIG. 2 illustrates a crystal constructed in accordance with the present invention;

FIG. 3 is a cross section on a reduced scale taken substantially along the line 3—3 of FIG. 2;

FIG. 4 is another modification of a crystal in accordance with this invention;

FIG. 5 is another modification of a crystal in accordance with this invention;

DESCRIPTION OF THE PREFERRED EMBODIMENT

Figure 6:
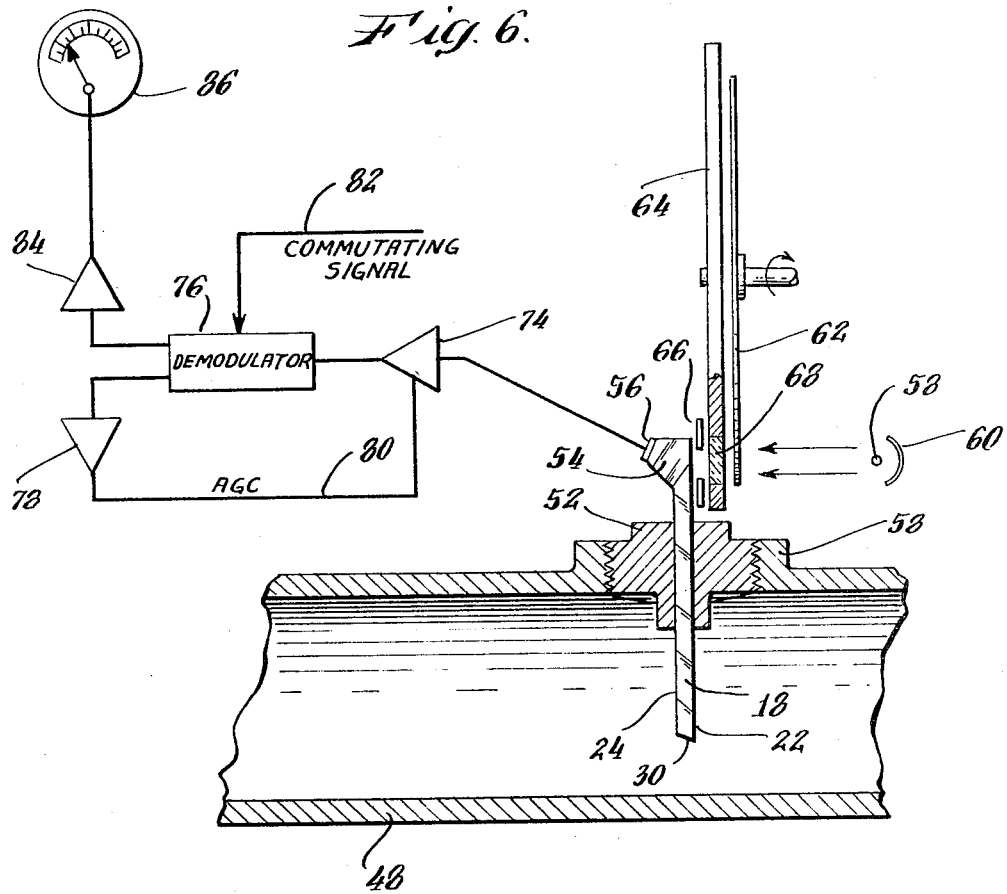
FIG. 6 is a partially schematic illustration of a double beam spectrometer in accordance with this invention.

As previously described, there is illustrated in FIG. 1 a prior art crystal 10 having a radiation entrance face 12 and exit face 14 forming a 90° roof and a bottom surface 16 perpendicular to the longitudinal axis. Radiation which enters through face 12 strikes the interface between the crystal and the fluid to be measured at greater than the critical angle and is multiply reflected until it leaves the exit face 14. The radiation is partially absorbed in accordance with the principles of ATR. When employing this crystal, the detector would be aligned with the exit face 14. However, as previously described, only about half the radiation will exit in that direction.

In FIG. 2 there is illustrated a crystal 18 in accordance with this invention. The crystal is characterized by a single exit face 20 which also serves to totally reflect the incoming radiation. The dual function of the exit face is a characteristic common to all crystals to be described herein. The crystal is rectangular in cross section and has a front surface 22, a back surface 24, and side surfaces 26, 28. As used herein, the terms "front," "back" and "side," are referenced to the incoming radiation as shown by the arrowed rays. The crystal also has a bottom surface 30 positioned at an angle 67.5° to front surface 22. As illustrated, radiation entering front surface 22 strikes the exit face 20 and is internally reflected downwardly along the axis of the crystal to bottom surface 30. As the radiation strikes bottom surface 30 at an angle less than the critical angle, this surface is metalized so as to be reflective. Thereafter it is reflected upwardly by multiple reflections at angles of 45° to the front surface 22 and back surface 24, finally exiting normal to the exit face 20. In this crystal the entrance face may be defined as the projection on front surface 22 of the exit face 20. The energy will spread to fill the whole exit face. However, due to the geometry involved, the exit face area is $\sqrt{2}$ times the entrance face area. Therefore, the brightness of the exit face will be $$\frac{1}{\sqrt{2}}$$

times that of the entrance face, ignoring normal reflection losses.

In FIG. 4, there is illustrated a crystal 32 which has a 30° exit face 34 and a 45° metalized bottom surface 36. This crystal has a higher sampling sensitivity as the beam makes multiple 60° reflections entering the crystal and multiple 30° reflections exiting the crystal. This configuration also provides an exit aperture brightness equal to that of the entrance face. This is due to the particular geometry which results in the exit face being smaller than the entrance face. For example, any ray entering the entrance face above the illustrated ray, exits from that portion of the exit face 34 labelled "exit."

Because of the 30° reflections, the modification of FIG. 4 is particularly appropriate for crystals having a high refractive index, such as germanium or silicon. The fact that the entrance aperture is larger than the exit aperture, in order to insure that the brightness of the exit and entrance faces are the same, is not particularly important as a slightly larger source area can be used. System performance, however, is determined by the brightness of the image at the detector.

In FIG. 5 there is illustrated a crystal 38 which, like the previously described crystals, has parallel front surface 40 and back surface 42. This crystal has a 30° exit face 44 and a 75° metalized bottom surface 46. This is a particularly interesting shape because energy which leaves the crystal from the lower half A2 of exit face 44 went down the crystal making 60° reflections and returned making 30° reflections. The energy leaving upper half B2, however, went down the crystal making 60° reflections and returned longitudinally. Accordingly, the incident energy is split into two portions, each of which has a different known history. The result is similar to having two crystals in one.

Figure 7:
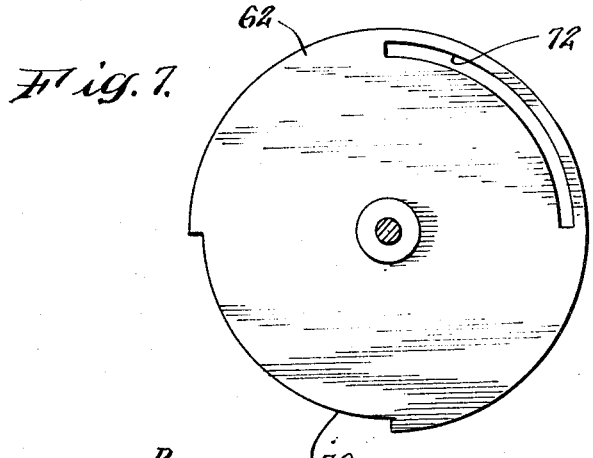
FIG. 7 illustrates the chopper used in the spectrometer of FIG. 6.

In FIG. 6 there is illustrated a double beam spectrometer utilizing a crystal of the type previously described. In the particular described embodiment, the spectrometer is utilized to continuously record a process stream. Accordingly, there is illustrated a pipe line 48 containing the fluid to be monitored. The pipe line has an internally threaded boss 58 into which is threaded a plug 52 supporting in the process stream a desired portion of crystal 18. Mounted closely adjacent the exit face of crystal 18 is a prismatic light pipe 54, against which is mounted the detector 56. One face of light pipe 54 is positioned close to the exit face of crystal 18 as previously described. A slight separation (on the order of a wavelength) is maintained to obtain reflection into the crystal. Another face, however, forms an extension of front surface 22 and thus the entrance face of crystal 18. A radiation source 58 and focusing mirror 60 are positioned to direct radiation through a rotating chopper 62 and a rotatable filter wheel 64 to an entrance slit 66. Filter wheel 64 carries a continuously variable filter 68 for selecting the wavelength of interest. The positioning of the elements is such that, in the absence of chopper 60, approximately one-half the radiation from source 58 and mirror 60 will be received by the entrance face portion of crystal 18 and approximately one-half will enter the light pipe 54 directly. Filter wheel 64, while variable, is normally stationary. Chopper 62 is continuously rotated. The construction of chopper 62 will be most apparent from FIG. 7 wherein it will be noted that the chopper, which is normally opaque to the wavelength of interest, has two arcuate slots, an outer slot 70 which permits radiation to pass only to crystal 18 and an inner slot 72 which permits radiation to pass only to light pipe 54. Each of these slots extends through an opposite 90° segment, the intervening segments being opaque. The radiation which passes through slot 70 and crystal 18 may be denominated the "sample" beam while that radiation which passes through slot 72 and directly into light pipe 54 may be considered the "reference" beam.

Figure 8:
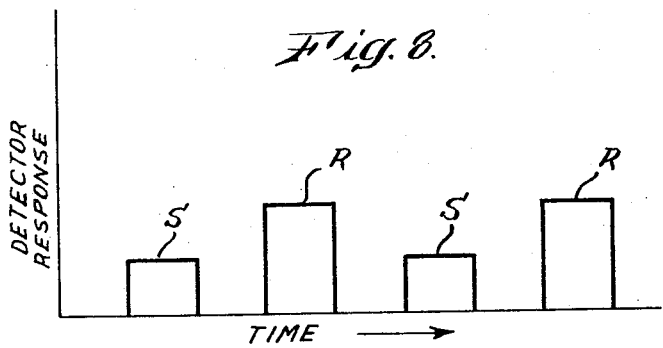
FIG. 8 is a diagram of the detector output of the spectrometer of FIG. 6.

Assuming that the wavelength of interest will be partially absorbed by the sample, the detector output is schematically illustrated in FIG. 8 wherein it will be seen that alternate electrical pulses are produced corresponding respectively to the intensities of the sample and reference beams. These electrical impulses are supplied to an amplifier 74 which, in turn, feeds a demodulator 76. The output of the demodulator corresponding to the reference beam is maintained at a preset constant level through amplifier 78 and automatic gain control feedback loop 80. The output of the demodulator corresponding to the sample beam is therefore proportional to the ratio of sample to reference beam intensity and is monitored by a meter or chart recorder. The operation of the demodulator is controlled by the commutating signal 82 derived from the rotation of chopper 62. This is a standard electronic ratio recording system. The resultant ratio output of demodulator 76 is amplified by D.C. amplifier 84 and displayed at a suitable recorder or meter 86.

It is believed that the many advantages of this invention will now be apparent to those skilled in the art. It will also be apparent that a number of variations and modifications may be made therein without departing from its spirit and scope. Accordingly, the foregoing description is to be construed as illustrative only rather than limiting. This invention is limited only by the scope of the following claims.

I claim:
1. A crystal for use in internal reflection spectroscopy, substantially polygonal in cross section and having at least one radiation exit face angularly positioned to totally reflect radiation into said crystal and to pass radiation leaving said crystal.
2. The crystal of claim 1 wherein said crystal is elongated, said cross section is rectangular, and said exit face is at one end thereof.
3. The crystal of claim 2 wherein the other end is metallized.
4. The crystal of claim 2 wherein said rectangular cross section is formed by planar side surfaces.
5. The crystal of claim 4 wherein a portion of one of said planar side surfaces defines a radiation entrance face.
6. The crystal of claim 5 wherein both of said entrance and exit faces are disposed at said one end of said crystal.
7. An elongated crystal for use in internal reflection spectroscopy, said crystal being substantially rectangular in transverse cross section, the ends of said crystal defining respective first and second single planar faces angularly disposed to the longitudinal axis of said crystal, said second face being metallized and said first face being positioned to totally reflect radiation into said crystal and to pass radiation leaving said crystal.
8. The crystal of claim 7 wherein said first face forms an angle of 45° to said axis and said second face forms an angle of 67.5° to said axis.
9. The crystal of claim 7 wherein said first face forms an angle of 30° to said axis and said second face forms an angle of 45° to said axis.
10. The crystal of claim 7 wherein said first face forms an angle of 30° to said axis and said second face forms an angle of 75° to said axis.
11. Apparatus for spectroscopic analysis by the attenuated total reflection method which comprises: means for forming first and second beams of electromagnetic radiation, each containing a wavelength of interest; a crystal defining a radiation entrance face positioned substantially solely in said first beam, a radiation exit face positioned to direct radiation into said crystal and pass radiation leaving said crystal, said crystal being arranged to contact a substance to be analyzed; detector means responsive to said first beam leaving said exit face and to said second beam to produce first and second signals proportional to the respective intensities therein of said wavelength of interest; and means for comparing said first and second signals.
12. The apparatus of claim 11 wherein said crystal is elongated, both of said entrance and exit faces being positioned at one end thereof.
13. The apparatus of claim 11 wherein said beam forming means comprises chopper means for alternately directing said radiation into said entrance face and onto said detector means.
14. The apparatus of claim 13 wherein said beam forming means comprises filter means for passing substantially only said wavelength of interest.
15. The apparatus of claim 13 wherein said detector means comprises a light pipe positioned to receive both of said first and second beams, and a photoelectric detector closely adjacent said light pipe.
16. The apparatus of claim 13 wherein said comparing means comprises a demodulator.
17. The method of analysis by attenuated total reflection which comprises: contacting a substance to be analyzed with an elongated crystal having a radiation entrance face and a radiation exit face at one end thereof; passing into said entrance face electromagnetic radiation containing a wavelength of interest; reflecting said radiation into said crystal by reflection from said exit face; multiply totally reflecting said radiation within said crystal at the interface between said crystal and said substance; passing said reflected radiation out of said crystal through said exit face; and measuring the intensity of said wavelength of interest leaving said exit face.

18. The method of claim 17 wherein said substance is a liquid and said crystal is immersed therein.

References Cited

UNITED STATES PATENTS 3,470,261   9/1969   Roberts _____ 356—74

RONALD L. WIBERT, Primary Examiner
V. P. McGRAW, Assistant Examiner

U.S. Cl. X.R.

356—97, 246